INVENTOR.
JERRY R. YOUNGSTROM
BY Robert G. Clay
ATTORNEY

INVENTOR.
JERRY R. YOUNGSTROM
BY Robert G. Clay
ATTORNEY 3,343,052
SERVO MOTOR CONTROL Jerry R. Youngstrom, Culver City, Calif., assignor to Ampex Corporation, Redwood City, Calif., a corporation of California Filed Sept. 18, 1964, Ser. No. 388,521
16 Claims. (Cl. 318—6)

ABSTRACT OF THE DISCLOSURE

An electrical servo system for controlling the operation of a direct current motor in which the conductive state of a switching means intermediate the motor and a power source is controlled by direct current control signals, said control signals being dependent on the direct current output of a servo amplifier which in turn is dependent on one or more direct current input signals representative of the actual operating conditions of the motor.

In recent years, semiconductive devices such as silicon controlled rectifiers (SCR's) have become increasingly popular as switching devices because of their ability to switch large currents at high speed. Thus they are employed in many servo systems which must have fast response and wide bandwidth. SCR's are similar to thyratrons, however, in that once they are turned on by current flowing into their gate elements, they can be turned off only by removal or reversal of their anode voltages, and reduction of their anode currents to zero. In order to provide precise and rapidly changing control of current flow through an inductive load of this nature, workers in the art have adopted a number of power modulation techniques. One common expedient is to utilize a proportional control, switching the states of the rectifiers so as to use desired fractions of an input wave. The proportional control circuits usually require rather complex phase firing circuits and also require a pair of SCR's for each motor winding, in order to insure turnoff by reverse biasing each rectifier during the alternate half cycles of the input wave.

A particularly useful example of such systems is found in digital magnetic tape transports, although the invention is not limited thereto. Magnetic tape transports are often required to operate compatibly with commands from an associated electronic data processing system and for these applications must start, stop and reverse on command with minimum loss of time. Digital tape transports are therefore designed to bring the tape to full speed or to a complete stop within a fraction of an inch of tape travel in either direction, and within relatively few milliseconds after the start or stop command is applied. These high speed starting and stopping mechanisms operate much more rapidly than can the more massive tape reel motors, so storage of buffer mechanisms in the form of multiple loop tension arms or vacuum chambers are often employed between the tape drive mechanisms and each of the reels. The loop lengths in the buffer mechanisms are controlled by reel motor servo systems in response to the status of the tape in the buffer. Thus, some well known systems sense the tape loop position and speed up or slow down the reel servo motor to tend to maintain the tape loop at a given position, or between selected limits.

In order to control the tape loop lengths without using overly long chambers, the tape reel motors must respond quickly to signals from their associated servo circuits. Hence, DC servo motors controlled by SCR's have been widely adopted to achieve the necessary response speed and bandwidth. In a typical proportional control system, two pairs of SCR's are employed for each of the motor windings. One pair is used for energization of the motor into a given direction of rotation. Along with the undesirably expensive circuitry needed for control of the phase firing angle, such as ramp generator circuits, this arrangement also requires a greater number of SCR's than is actually necessary for the control of current flow. In addition, the circuits are generally required to be AC coupled and the continual firing and extinction of the SCR's introduces substantial RFI problems, unless added circuits are utilized. These systems are in widespread use, however, because it is generally assumed to be necessary to convert the analog servo error signal into an analog or proportional DC signal for control of the motor, in order to obtain necessary reel servo performance.

Accordingly a primary object of the present invention is to provide motor control circuitry which functions to control a reversible, direct current motor positively but in relatively simple fashion.

Another object of the present invention is to provide reel servo controls for tape transports which embody a minimum number of components and thus are inexpensive to manufacture, but reliable in operation.

Another object of the present invention is to provide silicon controlled rectifier circuitry for inductive loads, which circuitry is characterized by employing a minimum number of SCR's and means to insure positive turnoff.

Another object of the invention is to provide improved control circuitry for DC servo motors which must be driven bi-directionally at rapidly changing rates of speed.

Yet another object of the invention is to provide improved servo controlled reel motor arrangement for tape transports and like systems.

Further aspects of the invention will be better understood from the following description of a praticular example. In general terms, however, systems in accordance with the present invention use on-off control of a servo motor to achieve desired speed changes. When the amplitude of a servo error signal is in excess of a selected threshold and of a given polarity, either one of two SCR's in the field winding circuits of a DC servo motor is fired. The firing interval is determined by the time during which the servo error signal is in excess of the selected threshold plus the remainder of the full wave rectified power half cycle on which the servo error signal drops below the threshold. The SCR will turn off at the end of each and every half cycle but will immediately retrigger if the servo error signal is still above the threshold. Although the appropriate servo motor winding is energized throughout a given time interval or else deenergized, the time constant of the motor is substantially longer than the time constant of the servo circuit, and the servo motor operates smoothly even though the tape itself may be caused to have a varying speed.

In a particular example of a system in accordance with the invention, a servo control for a reel motor in a digital magnetic tape transport generates an on-off signal from the analog servo error output signal, the servo error output signal being converted to a gate signal whenever the output signal is in excess of a selected threshold value. A gate signal is developed for excursions of each polarity, and each separate gate signal controls a separate SCR, each of which is in turn coupled to control the passage of energizing current through a different field winding of the motor. The servo error output signal is developed, in the particular system described, from a combination of tape speed, tape direction and tape position signals, and the servo system is intended to operate to maintain the tape loop within a relatively small amplitude deviation about a selected position. When the servo error signal is in its deadband, the motor remains unenergized. An excursion of either polarity outside the deadband, however, results in the generation of an appropriate gate signal, and the SCR is turned on for a number of cycles sufficient to return the tape loop to within the prescribed limits and thus the servo error output signal to the deadband. The changes in the gate signals are rapid relative to the much longer time constant of the motor itself, so that for all practical purposes the motor appears to operate in a proportional fashion even though the control system is of a relatively simple on-off type.

Other features of the invention reside in the coupling of unidirectionally conducting devices across the motor windings, and the use of a fluctuating power supply which is referenced to the same source as the SCR's. The unidirectionally conducting devices and the fluctuating power signal vary the SCR current and anode-to-cathode voltage in such manner as to insure trunoff of the SCR's at appropriate times and also to prevent the collapsing inductive fields of the motor windings from applying high reserve voltages across the SCR's. The arrangement includes further features to insure against erroneous or spontaneous triggering of an SCR, while insuring positive extinction of the SCR's, and to protect circuit components.

Better understanding of the invention may be had by reference to the following detailed description, taken in conjunction with the accompanying drawings, in which.

Figure 1:
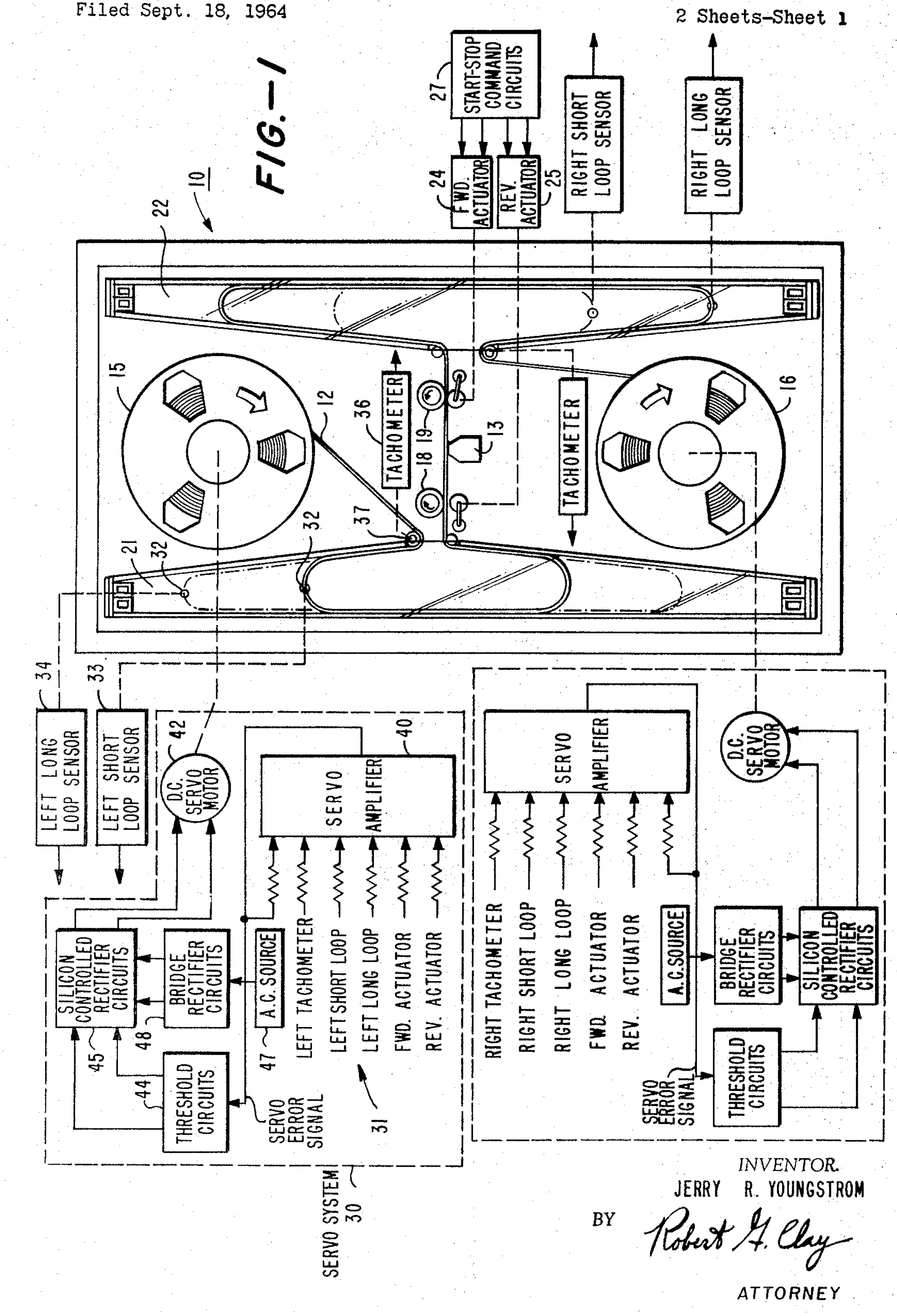
FIG. 1 is a combined block and schematic diagram of a servo system in accordance with the invention, for controlling DC reel servo motors in a digital magnetic tape transport.

FIG. 1 illustrates in block diagram form a control system for operation of the reel motors of a digital magnetic tape transport 10. Although systems in accordance with the invention may be utilized in other servo applications demanding high response speeds and wide bandwidths, digital magnetic tape transports provide particularly good examples of the application of the invention. In the illustrated system, for example, a tape 12 must be driven past magnetic heads 13 in either direction at extremely high rates of speed (e.g. 150 inches per second), and with minimum delay times in starting and stopping. The system shown is a high performance unit in which the tape 12 is transferred between a supply and a takeup reel 15, 16 respectively, with tape advance in the region of the heads 13 being controlled by either of a pair of capstan and pinch roller assemblies 18, 19. When an appropriate actuating signal is derived from associated data processing equipment (not shown) a pinch roller in one of the assemblies 18, 19 is urged against the continuously rotating capstan, driving the tape in the forward or reverse direction, dependent upon which of the contrarotating capstans is engaged. The acceleration and deceleration characteristics of the capstan and pinch roller assemblies 18, 19 are of course much faster than the characteristics of the reel drives, so buffer mechanisms in the form of vacuum chambers 21, 22 are utilized for providing low inertia storage means for the tape. The chambers 21, 22 permit the associated tape reels to accelerate to speed, or to decelerate to a stop, without imposing undue stress on the tape or introducing high inertia or tension into the capstan and pinch roller mechanisms.

As is often done in high performance tape transports, the status (e.g. length and velocity) of the tape in a buffer mechanism is used to control the operation of the associated tape reel. The present system achieves positive control of loop length and position, in dependence upon the mode of system operation, by sensing a number of different operative conditions, and generating a servo error signal to provide appropriate control. The status of the tape in the left-hand vacuum chamber 21 controls the operation of the motor for the supply reel 15, and the status of the tape in the right-hand vacuum chamber 22 controls the operation of the takeup reel 16. Inasmuch as the servo systems and various sensing mechanisms are alike and separate, only that portion of the system associated with the supply reel 15 and the left-hand vacuum chamber 21 will be described in detail.

One input signal component for the servo system is derived from the actuator circuits 24, 25 which control the direction of tape 12 movement. The forward actuator circuit 24 and the reverse actuator circuit 25 are coupled to control the capstan and pinch roller assemblies 18, 19 respectively. Signals for control purposes are derived from start-stop command circuits 27 which receive commands from the associated data processing system (not shown). Dependent upon which actuator 24 or 25 is energized, an appropriate signal is provided into the servo system 30 at an appropriate input point in a summing network 31.

Additional input signals for the servo system 30 are derived from loop length sensing means coupled into at least two different points along the vacuum chamber 21. These loop length sensing means may comprise photoelectric or capacitive sensing elements, or other conventional means, but in the present instance consist of pressure sensitive switches coupled through small holes or conduits 32 into the back wall of the vacuum chamber 21. Inasmuch as in the type of vacuum chamber shown the loop remains in balance between the two halves of the chamber, only one left short loop sensor 33 and one left long loop sensor 34 need be employed. As the tape loop passes a given sensor, when the tape loop is lengthening, the pressure in the region of the conduit 32, and therefore the pressure at the loop sensor 33 or 34 changes from the level maintained by the vacuum system to approximately atmospheric pressure. This change results in actuation of the pressure switch and generation of an appropriate signal input to the summing network 31 of the servo system 30.

All of the signals thus far described are either on-off or binary in character, but the remaining input signal for the servo system 30 is an analog signal derived from a tachometer 36 coupled to a guide roller 37 mounted at the exit end of the chamber. The left tachometer 36 generates a DC input signal whose amplitude and polarity represent the instantaneous velocity of the tape 12 at the roller 37.

In the servo system 30 the servo amplifier 40 may be of conventional form, including a feedback coupling and providing an analog output signal representative of the deviation of the tape status from a given condition. Summation of the forward and reverse actuator 24, 25 signals with the short and long loop sensor 33, 34 signals and the left tachometer 36 enables this system to operate so as to drive the tape loop to the optimum length position for a given direction of movement. If, for example, the tape 12 is being driven as shown in the forward direction, the storage capacity of the vacuum chamber 21 is utilized in an optimum fashion if the tape is kept at the short loop position. Then, if the start-stop commands require an immediate reversal of tape direction, the tape can immediately be fed into the chamber 21 even though the supply reel will take a considerably longer interval to be stopped and brought to speed in the reverse direction. If the tape loop were permitted to assume a random position within the chamber, or to oscillate between limits, conditions might be encountered in which the sequence of commands might result in loss of control of the tape loop. For like reasons, the tape loops are maintained in the long loop positions in the left-hand chamber 21, when the tape is being driven in the reverse direction, so that it is being fed into the chamber from the capstan and pinch roller assembly 19, and withdrawn from the chamber by the supply reel 15.

As previosuly described in conjunction with prior art systems, the servo error signal from the amplifier 40 may control phase firing circuits to generate a proportional power signal for a DC servo motor 42 coupled to the supply reel 15. Such a system attempts to energize the motor continuously, at rates proportional to the error signal. In accordance with the invention, however, it is found that in practical systems the effective equivalent of proportional control is achieved at the motor 42, even though only on-off control signals are utilized.

In accordance with the invention, the servo error signal is provided to threshold circuits 44, which include separate circuit means for detecting amplitude excursions in excess of a selected level and in either polarity in the servo error output signal. Amplitude excursions of either polarity which fall below the selected levels are in the servo deadband, so that the servo does not respond to immaterial changes or permit tape creep when the system is in the static mode. The threshold circuits 44 therefore remain off and prevent energization of either of the field windings of the DC servo motor 42. The threshold circuits 44 control SCR circuits 45 which energize the DC servo motor 42 for either direction of rotation. Power signals are derived from an AC source 47 through bridge rectifier circuits 48 and applied to the servo motor 42 under control of the SCR circuits 45.

It is evident that the operation of the system of FIG. 1 requires an expenditure of a substantially constant amount of work by the servo motor 42 in driving the supply reel 15 when the tape 12 is being driven at constant speed in a selected direction. By arrangement of the servo inputs from the actuators, the loop sensors and the tachometer inputs, the servo operates so that loop length oscillates continuously with small deviations in either direction about a given sensing position. For a given direction of tape movement, the component signals are balanced such that the loop shortens or lengthens to the given position at which oscillation begins. The controlling variations is that introduced by the loop sensor, and is relatively rapid. Therefore the servo error signal may shift in and out of the deadband rapidly. Each time the servo error signal exceeds the deadband level, the threshold circuits 44 fire the appropriate SCR in the circuits 45, and current flows in the corresponding winding of the motor 42. The current need not be continuous, in that rectified AC from the source 47 will typically briefly extinguish an SCR at zero crossing points in the AC signal. Nevertheless, the control signal is merely turned "on" and no conversion to a proportional value is used.

The time constant of energization of a typical DC reel servo motor will be of the order of 100 milliseconds. On the other hand, program rates for a digital tape transport may, in extreme instances, be of the order of 200 commands per second, and each half wave of a 60 cycle AC power wave will be 8.3 milliseconds in duration. Thus commands and firing signals may be changed many times faster than the response of the motor permits. The motor response therefore time averages the input commands and firing signals, and the net effect, in terms of the work of the motor, is a proportional response. Whereas the energizing signals are either full forward or reverse (or off) the reel motor actually tends to follow the needed speed. The tachometer signal and loop length sensor signal combine to cause the high speed oscillation at the desired sensing hole, but the motor and reel appear to run smoothly and continuously.

In the practical example of a digital type transport referred to above, the motor is driven by a rectified 60 c.p.s. alternating current signal. It is observed that the motor is energized for a given number of half-cycles, then off for another interval and so on. The number of half-cycles the motor is "on" varies from the order of 10 to the order of 50, and the duty cycles also vary, depending upon program rate and tape speed. Because the half-cycle interval (8.3 milliseconds) is very much shorter than the motor time constant, and because continuous energization of the motor is not needed at the highest (rewind) speed, the control system achieves both desired response speed and maximum energization efficiency.

Figure 2:
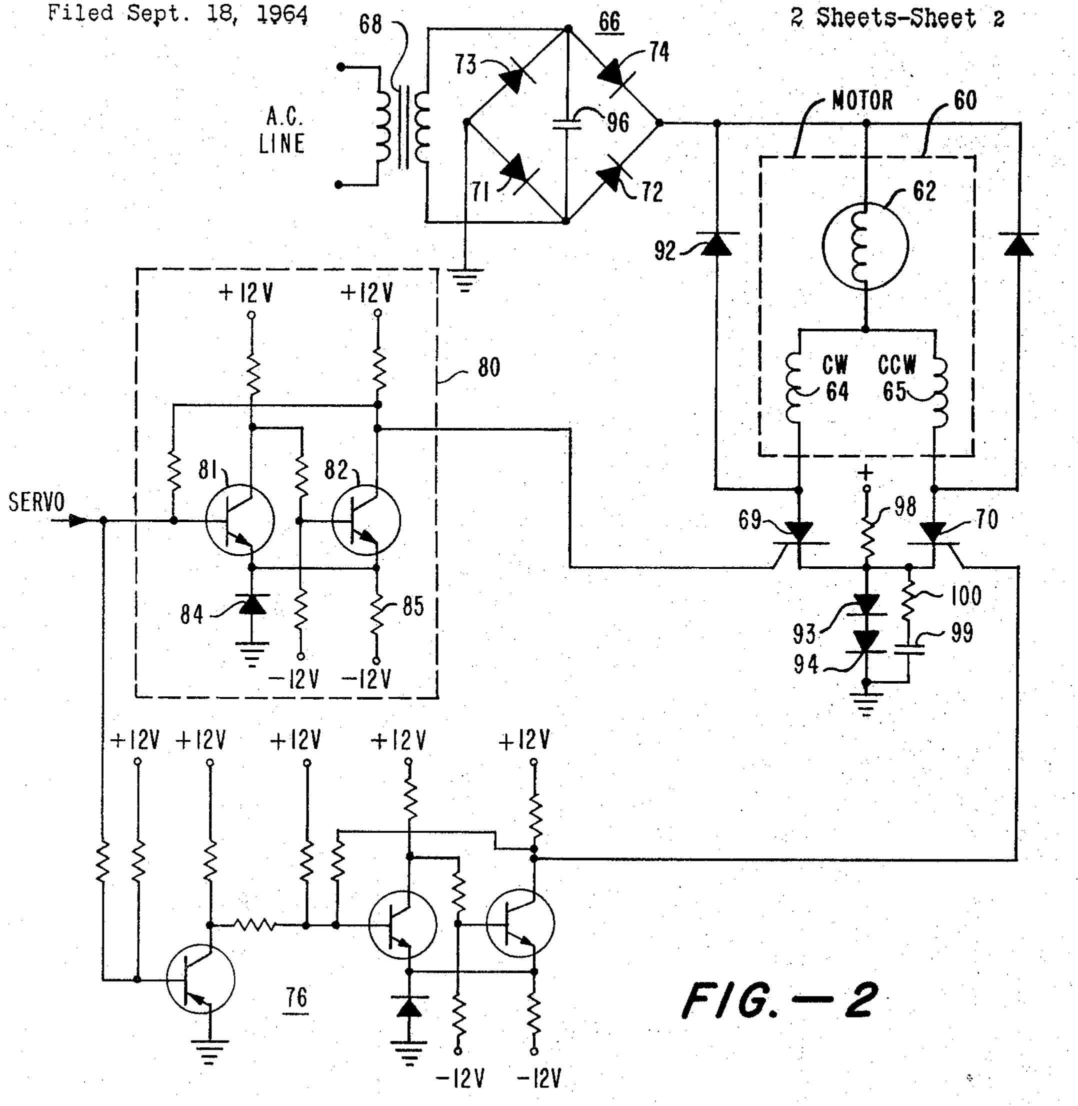
FIG. 2 is a schematic diagram of an inductive load control circuit in accordance with the invention.

FIG. 2 is a schematic diagram of a driver amplifier system embodying circuits in accordance with the invention; it is understood that two such drivers are utilized, one driving each reel motor. Each reel motor is of conventional type, being driven by direct current through an armature winding and through either a clockwise rotation field winding or a counter-clockwise rotation field winding. The driver amplifier controls the current flow through the field windings.

FIG. 2 represents one particular circuit arrangement which may be employed in the motor control circuit of the invention as shown in FIG. 1. In FIG. 2, the electrical circuitry of a DC servo motor 42 is represented within the broken line outline 60 at the right of the figure as comprising an armature 62 connected for series wound excitation with a clockwise field winding 64 and a counter-clockwise field winding 65 respectively. Only one of the field windings 64, 65 is energized at a time in accordance with the particular direction in which the armature 62 is to be driven. A bridge rectifier 66, comprising silicon diodes 71, 72, 73 and 74, is connected to provide a unidirectional voltage from alternating power received from an AC line circuit via a transformer 68. The voltage from the transformer 68 is applied across a pair of input nodes of the rectifier bridge 66, one output node of the bridge 66 being connected directly to the circuit of the motor 60 with the remaining output node being connected directly to a suitable reference potential, in this case ground. As will be apparent to those skilled in the art, other forms of rectifiers may alternatively be used.

The field windings 64 and 65 are individually connected in series with suitable control switching devices in the form of silicon controlled rectifiers (SCR's) 69 and 70 respectively. The SCR69 and 70 are controlled respectively by individual triggering circuitry which is operative in response to opposite polarity signals received from the servo amplifier of FIG. 1. Since the separate triggering circuits for the two SCR69 and 70 are identical with the exception of an inverter stage 76 which is employed in the trigger circuitry coupled to the SCR70 in order to establish a gating signal of appropriate polarity, it will suffice to describe in detail the operation of the SCR69 coupled to the clockwise winding 64. The other SCR70 and its associated trigger circuit operate identically in response to servo input signals of the opposite polarity after inversion by the inverter stage 76.

The trigger circuitry associated with the SCR69 comprises a binary circuit 80 having a pair of transistors 81 and 82 interconnected in the circuit shown within the dotted line box at the left of FIG. 2. The circuit 80 operates in a fashion equivalent to a Schmitt trigger. With the servo input signal in the deadband, or of negative polarity, the transistor 82 is conducting, and the transistor 81 is non-conducting. The collector resistor of transistor 81 holds the base of the transistor 82 positive and conducting in this condition. A first steady state voltage level is thus maintained at the output terminal of the circuit 80 and the control gate of the SCR69.

The circuit 80 "sets" to a second output level when the input signal to the base of the transistor 81 exceeds a given positive threshold. When the circuit 80 is set, the transistor 81 is driven to conduction, the base voltage of the transistor 82 is dropped, and the transistor 82 becomes non-conductive. If the input signal returns below the threshold level to the deadband, the circuit 80 resets. A slight hysteresis effect makes the reset level slightly less than the set level, but this has no effect on system operation.

As depicted, the binary circuit 80 also includes a diode 84 connected to the common emitter connection of the transistors 81 and 82 for the purpose of providing an emitter potential below ground (approximately −0.7 volt for a silicon diode), which in conjunction with the approximately 0.2 volt collector-emitter voltage drop of transistor 82, provide a negative bias of −0.5 volt on the SCR69 gate when the servo input signal is in the deadband and the circuit 80 is in the reset state. This bias level insures that the SCR69 is blocked at peak line voltage, because the transistor 82 conducts at saturation and the gate of the SCR69 is thus maintained negative.

A resistor 85 couples the emitter of the transistor 82 to the −12 volt source, and protects the transistor 82 from over-dissipation while conducting. Such protection is useful because the gate electrode of the SCR69 appears as a voltage source when the SCR69 conducts and the emitter voltage might be drawn too far positive. The presence of the resistor 85 coupled to the negative source accordingly provides a separate circuit path which becomes operative when the emitter voltage attempts to rise.

The it is desired to actuate the motor 60 in the clockwise direction, a positive signal in excess of the threshold level is applied to the input of transistor 81, turning off the transistor 82 so that the SCR69 is triggered into conduction by a positive potential on its gate electrode. Current then flows from the rectifier bridge 66 through the armature 62 and the clockwise field winding 64, and the motor 60 supplies torque in the clockwise direction. So long as the transistor 82 is maintained off, the SCR69 permits current to flow through the motor windings 62 and 64 for each half cycle of alternating line voltage. The SCR 69 is turned off momentarily at each node in the AC wave, but is immediately retriggered as long as the circuit 80 is set.

When the motor winding 64 is to be deenergized, the binary circuit 80 is reset, returning the transistor 82 to conduction and the signal tries to return to −0.5 v. at the gate electrode of the SCR69. However, while the SCR69 remains in the conducting state the gate acts like a +0.7 v. voltage source. The SCR69 remains conducting, once triggered, and it can only be turned off by reducing the anode driving voltage to zero (relative to the cathode) and by reducing the anode current below the holding current for the device. Positive turnoff and freedom from erroneous firing are assured by the circuit of FIG. 2.

The full-wave rectified driving voltage derived from the bridge rectifier 66 goes to approximately zero twice for each cycle of input voltage from the 60 cycle per second AC line. Because the cathode of the SCR69 and the common side of the bridge 66 are both reference to ground, the voltage drop across the diodes (0.7 volt for silicon rectifiers) must be considered. Actually, therefore, the voltage from the motor armature to the SCR cathode goes two diode drops (here −1.4 volts) negative twice each cycle.

The motor 60 has a significant time constant with respect to the period of the driving voltage and represents an inductive load, thus resulting in a lagging current. For the polarity of the rectifiers 71–74 as shown, current flows in a downward direction through the windings 62 and 64 of the motor 60. It will be observed that, without an inductive load, the SCR's would theoretically be turned off at each zero crossing of the AC wave, as voltage and current both approach zero. The signal at the gate of an SCR would then determine whether it would fire on the next half-cycle. Actually, however, the presence of the inductive load, the susceptibility of SCR's to firing under sharp voltage transients, and the tendency of an SCR to remain conducting when anode current is flowing require that positive control of SCR conduction and extinction be exercised.

To this end, a diode 92 is connected across the winding of the motor 60 to the anode of the SCR69. The diode 92 becomes conducting as the bridge voltage approaches ground, insuring reduction of the current at the SCR69 to zero. A pair of diodes 93 and 94, together with the associated resistor 98, are connected in a bias network between the cathodes of the SCR69 and 70 and ground. The diodes 93 and 94 serve to set the potential level of the SCR cathode at two diode drops (1.4 volts) above ground when conducting, but are not required to extinguish conduction therein in the arrangement shown.

The diodes 93, 94 are coupled through the resistor 98 to a positive voltage source which may conveniently be the output terminal of the bridge rectifier 66. A further useful feature is the inclusion of a passive network comprising a capacitor 99 and a resistor 100 coupled to the SCR cathodes in a manner to shunt the diodes 93, 94. When the forcing function (to be described below) terminates, the voltage at the SCR cathodes tends to go negative immediately, reducing the back bias. The charge on the capacitor 99 serves to maintain the bias level, and the discharge time of the capacitor 99 is extended by the resistor 100.

Figure 3:
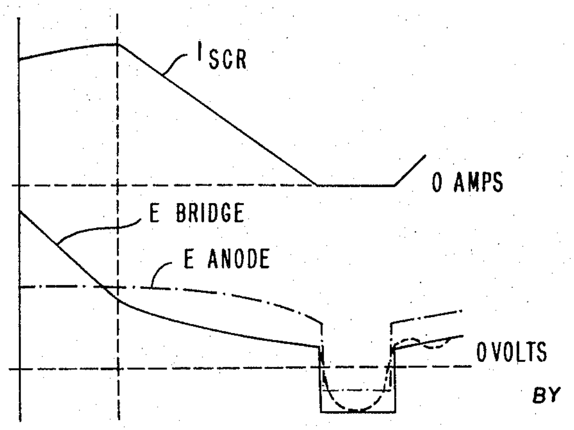
FIG. 3 is a waveform diagram of selected voltage and current relationships which are useful in explaining the operation of the arrangement of FIG. 2.

For a detailed understanding of the operation of the circuit of FIG. 2, reference should also be made to the waveforms of FIG. 3. The three waveforms shown are SCR current ($I_{scr}$), the voltage at the output terminal of the bridge ($E_{bridge}$) and the voltage at the SCR anode ($E_{anode}$). The waveforms represent an interval in time during which the SCR is being turned off, then retriggered. At zero time as represented on FIG. 3, the the bridge voltage is dropping sinusoidally and the SCR current is also varying sinusoidally, but lagging as determined by system conditions. The SCR is conducting, and its cathode voltage is at +1.4 volts, as set essentially by the diodes 93, 94. As the bridge voltage lowers, it enters the non-linear impedance region of the bridge diodes 71–74. Thus the voltage $E_{bridge}$ continues to drop substantially linearly but at a much lower rate. This change results in collapse of the motor field, as the current in the winding 64 attempts to keep flowing. Consequently, the voltage across the shunting diode 92 reverses, forward biasing the diode 92 and causing it to conduct. A substantial portion of the current from the motor 60 becomes diverted away from the SCR69 through the diode 92 with the result that the SCR current is also turned off at the zero crossing of the AC line voltage. As the bridge voltage drops, the SCR anode voltage follows, tending toward a like waveform. In addition to diverting current away from the SCR69, the diode 92 fulfills another important function by preventing any reverse voltage from building up across the windings 62 and 64 of the motor 60, blocking the collapsing inductive field therein from punching through either of the SCR69 and 70.

The diode 92 acts at this time as a clamp, tending to draw the SCR anode toward the level of the bridge voltage. The forcing back bias across the SCR69 is reduced by one diode drop, or approximately −0.7 volt. The diversion of current from the SCR69 continues until the forcing voltage ($E_{bridge}$) from the bridge becomes approximately zero. At this time the diode 92 has all the current because there is no effective source to drive current through the SCR69. The SCR69 current is reduced effectively to zero, and in any case below the holding level. The anode to cathode potential difference is driven sharply negative with the bridge voltage, which drops to the −1.4 volt level for a few microseconds.

The brief negative excursion of the bridge voltage occurs between the times two of the bridge diodes 71–74 are driven out of conduction and the remaining two have not yet started to conduct. During this interval the diode 92 operates as a clamp, as above described. As both current and voltage go to zero, conduction ceases in the SCR69 and it blocks after recombination time, leaving the bridge voltage free to set itself. The bridge voltage thus seeks to drop to the −1.4 volt level, and holds this level momentarily until the SCR current again commences or the line voltage builds. The SCR anode also is driven negative at the same time and with a like wave shape as it follows the bridge. Thus the gate electrode can go negative, and the gate no longer acts as a positive voltage source. When the anode voltage again goes positive with the bridge the SCR remains blocked as long as the binary circuit 80 is reset. In the example shown, the binary circuit 80 is assumed to be set, so that the SCR69 refires and current begins to build up.

A capacitor 96 is coupled across the input nodes of the bridge 66 in order to reduce the sharp voltage transients which would otherwise be developed as the diodes 71–74 break into conduction and which might have an undesirable tendency to spontaneously trigger one of the SCR69 or 70. The effect is to round out the waveforms, as shown in dotted lines in FIG. 3.

The diodes 93 and 94, as stated above, are not essential to the operation of the motor control circuit as described. Sufficient back bias is developed to turn off the SCR69 with the cathode thereof connected directly to ground. However, the diodes 93 and 94 together with the associated resistor 98 coupling to the positive source and the passive networks 99, 100, advantageously serve to develop and hold a selectable back bias level on the ground return side of the SCR cathodes which protects the SCR's against ground noise. Additional diodes may be placed in series with the diodes 93 and 94 to increase the back bias if such ground noise is a particular problem. Note, however, that positive control is achieved not only by starving the SCR current. In addition, the bridge and SCR are referenced to a like point and are used in an interrelated manner. The bridge tends to go negative relative to the SCR anode at each zero crossing, and is released to do so when the SCR blocks. The SCR anode is in turn clamped to the bridge, and is itself driven negative. Consequently, a single SCR may be controlled by an AC wave in as positive a manner as a pair of oppositely poled SCR's.

As is well-known, the application of a triggering signal to the SCR when the AC power signal is at a cyclic peak results in a fast rising pulse of high amplitude. Consequently, high frequency noise may be introduced into the system. The present control circuits may avoid transients of this nature by gating the threshold signal to the AC wave so that the SCR's will turn on only at nodal points in the AC wave. As previously discussed, a conducting SCR does not extinguish until a nodal point in the AC wave, so that sharp trailing edges are not introduced in the power signal. Note that a sharp voltage spike typically occurring when the bridge diodes break into conduction has been omitted for clarity in the voltage waveforms of FIG. 3.

The frequency of the AC signal is not significant, except that the half-cycle interval must be substantially shorter than the motor time constant. Obviously, a circuit of this nature is not required if the motor is merely to be turned on full speed, or turned off, so that some form of intermediate speed operation is assumed. Note that this result is achieved with circuits which are entirely direct-coupled, and at that sharp transitions, such as result from phase firing circuits, are not introduced in the power line. Consequently, RFI problems are greatly reduced because of the absence of transformer couplings and high frequency noise.

While there have been described above particular arrangements for providing controlled energization of a DC servo motor or any inductive load, it will be appreciated that a number of alternative forms are feasible. Thus although the circuits have been described in specific relation to a DC servo motor system, they may be used as well to control any inductive load. Accordingly, the invention should be considered to include all modifications and variations falling within the scope of the appended claims.

What is claimed is:

1. A servo system comprising a bidirectional direct current motor for driving a member; servo amplifier means having an electrical input signal indicative of at least one operative condition of the driven member and producing an electrical analog error signal indicative of the difference between the sensed condition and a desired condition; a pair of amplitude sensitive means responsive to the error signal for providing on-off signal variations representative of different directions of movement of said driven member; direct current supply means; and switching means coupling the direct current supply means to the motor and responsive to the amplitude sensitive means, for energizing the motor in selected rotational directions corresponding to the on-off signal variations.

2. The invention as set forth in claim 1 in which the motor has a selected time constant of energization; the means for sensing a condition of the driven member includes means for sensing the velocity of the driven member; and the on-off signal variations are provided at a rate relative to the time constant of the motor to operate the motor at substantially constant speeds less than the full motor speed.

3. A servo system comprising a motor for driving a member, the motor having a selected time constant of energization and a pair of windings for energization in opposite directions; means for sensing at least the velocity of the driven member to determined the status of the driven member; servo amplifier means having an electrical input signal responsive to the sensing means and providing an electrical analog error signal the polarity and magnitude of which is representative of a desired change in the state of the driven member; a pair of amplitude sensitive circuit means each responsive to a different polarity variation of the error signal and each providing a control signal indication when the error signal excursion is in excess of a predetermined threshold amplitude and of appropriate polarity; current supply means for energizing said motor; and electronic switching means controlling the coupling of the current supply means to the windings of the motor for energizing the motor in either direction in correspondence to the control signal indications.

4. The invention as set forth in claim 3 above, in which the electrical analog error signal undergoes signal variations requiring motor operation in intermittent bidirectional fashion and at speeds less than the maximum motor speed under full energization; the driven member includes a magnetic tap; the desired condition is the maintenance of a selected loop length in the tape; the sensing means includes electrical means for sensing loop position as well as tape velocity; and the signals energizing the motor are substantially continuous over selected intervals of time but the operation of the motor is also substantially continuous at less than full speed because of the time constant of the motor.

5. A servo system for a magnetic tape transport utilizing a low inertia tape loop, and for controlling the length of the tape loop by operation of a direct current motor, comprising: power switching means coupled to the motor for energizing the motor in either direction in response to applied electrical control signals; means responsive to the tape loop condition for providing at least one servo electrical input signal; electrical servo amplifier means responsive to the servo input signal for generating an electrical error signal the polarity and magnitude of which is representative of a desired change in the tape loop condition; means responsive to the error signal for generating control signals of fixed amplitude which have varying durations dependent upon the time interval the error signal is in excess of a predetermined threshold amplitude; and means coupling the fixed amplitude signals as control signals to the power switching means.

6. The servo system as set forth in claim 5 in which the motor is a series bidirectional DC motor having clockwise and conterclockwise windings for energization in opposite directions of rotation, and having a time constant of energization substantially long relative to the typical interval the error signal is in excess of the predetermined ampltiude; the error signal is an electrical analog signal of varying magnitude and polarity; the means for providing fixed amplitude control signals include a pair of threshold detector circuits each responsive to error signals in excess of a predetermined amplitude and each responsive to signals of a different polarity; and the power switching means includes a pair of switching devices each coupled to one of said motor windings and to one of said detector circuits, the conductive state of each switching device being responsive to the presence of an applied control signal, and which power switching means provides substantially full current to the motor for intervals of energization which are interleaved with intervals of de-energization occurring substantially rapidly relative to the time constant of the motor, such that the work done by the motor appears substantially continuous in typical operation.

7. In a tape transport system having a tape loop, a DC reel servo motor including clockwise and counterclockwise windings, and means for generating an analog error signal to correct the tape loop by actuation of the servo motor; a motor control system comprising: a pair of threshold detector circuits, each responsive to error signals in excess of a predetermined amplitude and each responsive to signals of a different polarity; a pair of silicon controlled rectifiers, each coupled in series with a different one of the motor windings, and each coupled to be controlled by a different one of the threshold detector circuits, to be fired thereby; rectified current supply means coupled in series with the motor windings and the silicon controlled rectifiers; means, including diode means individually shunting each of the motor windings, for extinguishing the silicon controlled rectifiers in the absence of a control signal, and bias means coupled to both of the silicon controlled rectifiers.

8. In a tape transport system having a tape loop, a DC reel servo motor including clockwise and counterclockwise windings, and means for generating an error signal to correct the tape loop by actuation of the servo motor; a motor control system comprising: a pair of threshold detector circuits, each responsive to error signals in excess of a predetermined amplitude, and each responsive to signals of a different polarity; a pair of silicon controlled rectifiers, each rectifier coupled in series with a different one of the motor windings and each coupled to be controlled by a different one of the threshold detector circuits to be fired thereby; a full wave rectified current supply coupled in series with the windings and the silicon controlled rectifiers; and means including diodes shunting each of the windings and coupling the current supply to the silicon controlled rectifiers for extinguishing the silicon controlled rectifiers.

9. A circuit for energizing a DC servo motor in either direction in response to an applied analog signal, the motor having clockwise and counterclockwise field windings, the circuit comprising: a first threshold detector circuit receiving the analog signal and providing a first firing signal in response to analog signal excursions of a first polarity and in excess of a predetermined amplitude; a second threshold detector circuit receiving the analog signal and providing a second firing signal in response to analog signal excursions of the second polarity and in excess of a predetermined amplitude; means providing a rectified power signal to the field windings; a pair of silicon controlled rectifiers, each coupled to a different one of the field windings and controlling the power signal therethrough, each of the silicon controlled rectifiers being controlled by a different firing signal; and means including a pair of diodes coupled to the field windings and the silicon controlled rectifiers for extinguishing the silicon controlled rectifiers in the absence of firing signals.

10. The invention as set forth in claim 9 above, wherein the means for providing a rectified power signal comprises a diode bridge coupled to the field windings and a pair of diodes, each diode of said pair shunting a different one of the field windings.

11. A circuit for energizing a DC motor in either direction of rotation in response to an applied signal, the motor having first and second field windings and the circuit comprising: means responsive to the applied signal for generating first and second firing signals designating opposite directions of rotation; a pair of silicon controlled rectifiers, each coupled to a different one of the field windings and each coupled to be triggered by a different one of the firing signals; rectifier means responsive to an alternating current power signal and coupled to the field windings for providing energizing current thereto; and a pair of diodes, each coupled to shunt a different one of the field windings, and each coupled to the associated one of the silicon controlled rectifiers, the diodes being coupled in opposite directions of polarity to the silicon controlled rectifiers.

12. The invention as set forth in claim 11 above, wherein the anodes of the silicon controlled rectifiers are coupled to the motor windings and wherein the firing signals are applied to the gate electrodes of the silicon controlled rectifiers.

13. The invention as set forth in claim 12 above, wherein the rectifier means is coupled to a reference voltage, and wherein the cathodes of the silicon controlled rectifiers are coupled to a like reference voltage, such that on removal of the firing signal at a silicon controlled rectifier conduction ceases and the anode is driven negative relative to the cathode, and including bias means coupling the cathodes of the silicon controlled rectifiers to the reference potential.

14. The invention as set forth in claim 13 above, wherein the rectifier means comprises a silicon diode bridge, and the bias means comprises a pair of series-connected silicon rectifiers.

15. A circuit for energizing a DC motor in either direction of rotation in response to an applied signal, the motor having first and second field windings and the circuit comprising: means providing an analog bipolar servo signal; first and second controlled rectifier means, each coupled to a different one of the field windings; a source of alternating current having a cycle time which is relatively short compared to the time constant of the motor; a common potential source; a full wave diode rectifier bridge having one output terminal coupled to the common potential source and input terminals coupled to the source of alternating current; the other output terminal of the bridge being coupled to the windings of the motor; first and second silicon controlled rectifiers each having its anode coupled to a different one of the motor windings; first trigger means responsive to polarity excursions of one sense in the servo signal and coupled to the gate electrode of the first silicon controlled rectifier; second trigger means responsive to polarity excursions of the second sense in the servo signal and coupled to the gate electrode of the second silicon controlled rectifier; first and second voltage clamping means coupled to the first and second trigger means respectively; diode means coupling the anodes of the silicon controlled rectifiers to the second output terminal of the rectifier means; and means including back bias means coupling the cathodes of the silicon controlled rectifiers to the source of common potential.

16. The invention as set forth in claim 15 above, wherein the first and second trigger means each include a normally conducting transistor having its collector coupled to the gate electrode of the associated silicon controlled rectifier; wherein the first and second clamping means each include diode and resistive means both coupled to the emitters of the associated transistors to prevent transistor over-dissipation due to the gate electrodes of the silicon controlled rectifiers appearing as voltage sources when the transistors are conducting; and wherein the back bias means includes at least one diode; and passive circuit means including a discharge capacitor and current limiting resistor shunting the diode.

References Cited

UNITED STATES PATENTS

| | | | |
|---|---|---|---|
| 3,105,179 | 9/1963 | Young et al. | 318—6 |
| 3,187,243 | 6/1965 | Long | 318—6 |
| 3,191,113 | 6/1965 | Gargani | 318—252 |
| 3,223,911 | 10/1965 | Seiler et al. | 318—341 X |
| 3,256,463 | 6/1966 | Davis | 323—22 |
| 3,284,688 | 11/1966 | Black | 318—345 X |

ORIS L. RADER, *Primary Examiner.*

B. A. COOPER, *Assistant Examiner.*